March 30, 1948. J. G. JUHASZ 2,438,609
CIRCUIT CONTROL DEVICE
Filed Feb. 19, 1945 2 Sheets-Sheet 1
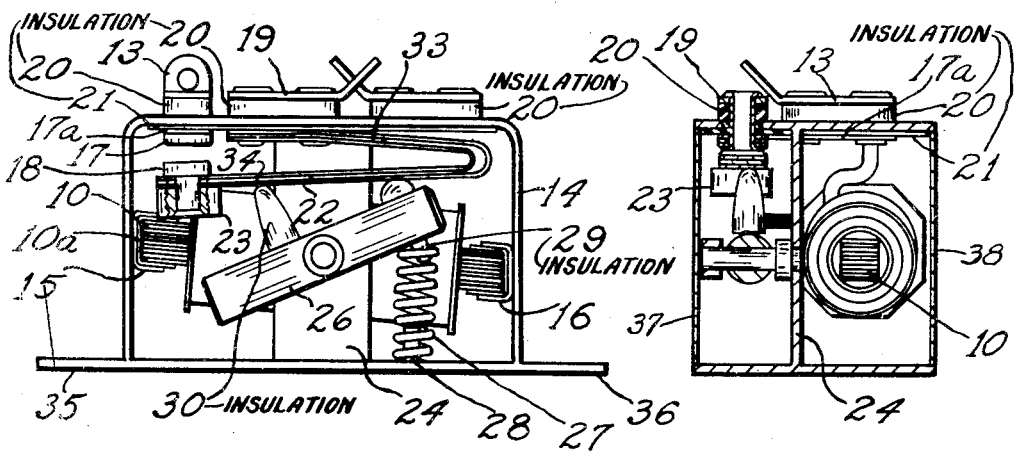
Fig. 1 (Open)
Fig. 3
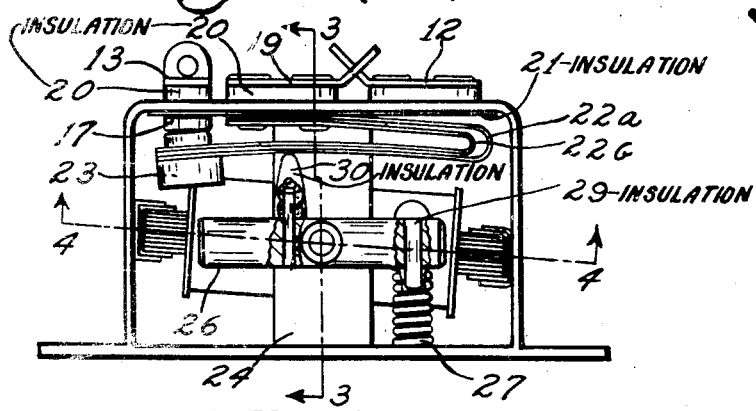
Fig. 2 (closed)
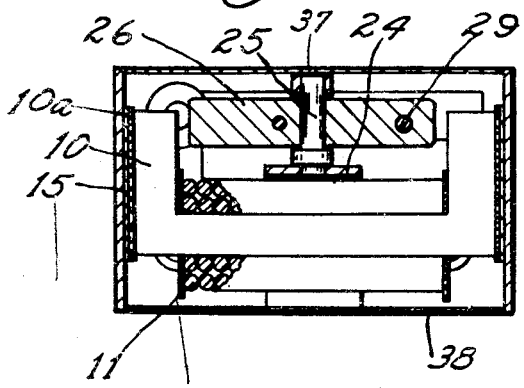
Fig. 4
INVENTOR.
James G Juhasz
BY March 30, 1948.  J. G. JUHASZ  2,438,609
CIRCUIT CONTROL DEVICE
Filed Feb. 19, 1945   2 Sheets-Sheet 2

INVENTOR.
James G Juhasz
BY
Zabel Barber Fitzbaugh & Wells

UNITED STATES PATENT OFFICE 2,438,609

CIRCUIT CONTROL DEVICE

James G. Juhasz, Chicago, Ill.

Application February 19, 1945, Serial No. 578,747

8 Claims. (Cl. 200—103)

The present invention relates to circuit control devices and is particularly directed to the provision of a circuit control device that is adapted to be used where a circuit is closed in response to the flow of current above a predetermined level in an associated circuit, and the circuit may also be opened by a reduction in current below the predetermined level, it being a characteristic of the device that a greater amount of current is required to flow in order to close the circuit than is required to keep the circuit closed.

The invention is particularly applicable to such uses as that of closing the starter winding circuit in split phase motors in case of starting or loss of speed due to overload, although the device is not limited to that use. It is so constructed that it may be sealed and made dust, dirt, oil and gas proof so it may be used under a great variety of conditions.

The present invention contemplates a circuit closing device of the character described wherein an electromagnet is energized by a coil in the main circuit which controls the operation of the device. This electromagnet has two armatures associated therewith, and the two armatures are arranged to act upon a movable contact that controls a point in the controlled circuit. The arrangement is such that as the current in the main circuit goes up there is an initial tendency on the part of the electromagnet to hold the control contacts separated until a predetermined current flow is reached, whereupon an unbalanced condition is established causing a sudden closing of the control contacts to energize the controlled circuit. On the downward trend of current in the main circuit the controlled contacts will remain closed longer, thus opening the controlled circuit when the current in the main circuit is at a substantial lower level than it was at the closing of the controlled circuit.

The novel features of my invention will be more clearly understood from the following description and accompanying drawing wherein a preferred form of the invention is shown. It should be understood however, that the drawings and description are illustrative only and are not to be taken as limiting the invention except insofar as it is limited by the claims.

In the drawings:

Figure 1 is a view in side elevation of the circuit control device, with the cover removed;

Figure 2 is a view like Figure 1 but showing the parts in changed position;

Figure 3 is a sectional view taken on the line 3—3 of Figure 2;

Figure 4 is a sectional view taken on the line 4—4 of Figure 2;

Figure 6:
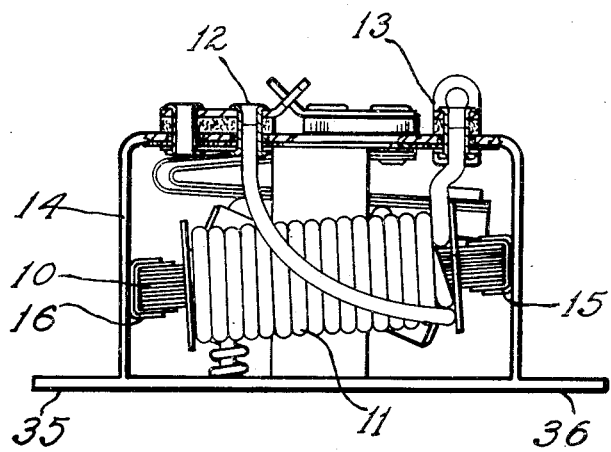
Figure 6 is a view in side elevation of the device showing the side opposite that shown in Figure 1, certain parts being broken away to illustrate details of construction.

Referring now to the drawings, the present circuit controlling device is of the type wherein the magnetic flux created in a ferro-magnetic core is utilized to attract an armature which in turn acts upon a movable contact to move it to closed position. A device of this character is shown in the application of Marie Yuhas, Serial No. 512,696, filed December 3, 1943, now Patent 2,411,405, Nov. 19, 1946, for Starter arrangement for split phase motors. The present device is operable with magnetic flux obtained in the same manner as in the above mentioned application or magnetic flux obtained by a separate winding apart from a motor winding as illustrated in the accompanying drawings. In the specific device shown, an electromagnet core 10 is adapted to be energized by a winding 11, the terminals of which are shown at 12 and 13. This winding may be a part of the motor winding as stated above, or may be in series with the main motor winding so as to be energized at any time the motor circuit is closed. The winding 11 as shown herein comprises a low resistance winding made up of a short length of relatively heavy wire so that the loss in the winding under normal running is very slight. The voltage drop across the winding is about .2 volt at 35 ampere load.

The electromagnet 10 is carried by a housing 14 which has two brackets 15 and 16 in which the core is secured. These brackets 15 and 16 are offset with respect to the housing 14. On the top part of the housing I mount a pair of contacts 17 and 18. The contact 17 is riveted to a spring strip 17a which extends across the housing and is riveted to the terminal 13. The contact 18 is connected to another terminal 19 on the outside of the housing 14. Suitable insulating washers 20 are provided exteriorly of the housing and a plate 21 of insulation is provided inside the housing so as to insulate the terminals and the contacts from the housing. The contact 18 is a spring mounted contact carried by a suitable spring 22 which extends substantially parallel to the housing wall when the contacts are separated. A soft iron slug 23 is riveted to the spring. For convenience and economy the same rivet that carries the contact 18 serves to secure the slug 23. This slug 23 is positioned to press against one end of the magnet core 10. A suitable insulating fiber covering 10a is provided on the core so that the soft iron slug 23 does not directly engage the core. A bridge bar 24 is fastened in the housing so as to extend between the top and bottom walls thereof. This bridge bar mounts a pivot pin 25 upon which an armature 26 is pivoted. The armature 26 is spring pressed by a spring 27 into the position shown in Figure 1. The spring 27 is a coil spring, one end being mounted on a pin 28 that is mounted in the housing wall. The other end of the spring is fitted over an insulating pin 29 that extends through the armature 26. The pin 29 has a head sufficiently large to engage the spring 22 that carries the movable contact 18 and keep the armature out of engagement with it.

The armature 26 carries a second pin 30 which is of insulating material. This pin has a rounded tip which engages the spring 22. The pin is offset with respect to the axis of the armature 26 so that when the armature is parallel to the spring 22 the pin will not have reached its maximum point of travel toward spring depressing position. The spring 22 therefore also tends to move the armature to the position shown in Figure 1.

The operation of the device can best be understood by reference to the Figures 1 and 2 showing the two limiting positions of the parts. A circuit is closed to direct the current through a main winding 31 of a motor. The initial result is a surge of current which increases the flux in the armature core 10 at a rapid rate. This flux attracts the slug 23 so that as the current builds up there is an increasing tendency of the slug to hold the contacts for the controlled winding 32 separated. However, the increasing flux in the core 10 exerts an attractive force upon the armature 26. As the flux concentration increases the armature 26 receives a higher percentage of it due to saturation of the path through the slug 23, and at a predetermined current flow the armature 26 is attracted with sufficient force to overcome, through pressure of the pin thereon against the spring 22, the attraction for the slug 23. When this occurs the contacts are closed with a snap and the continued attraction of the armature 26 causes the contacts to be maintained until the current drops to such a value that the spring 22 can separate the contacts.

The armature 23 is normally held tightly against the layer of insulating fiber 10a on the core 10. The core 10 is energized when the motor is running and even when the motor is not running the residual magnetism of the core holds it. If the motor is turned upside down or jarred, the hold of armature 23 to the core is sufficient to prevent closing of the contacts 17 and 18.

If the motor is running and the main winding continues to take more current due to overloading of the motor and slowing down of the motor, the increased current in the main winding will increase the magnetic flux in the core 10 until finally the armature 26 will close again to again energize the starter winding.

The spring 22 consists of a pair of phosphor bronze spring strips 22a and 22b. These strips are separated by filler strips 33 and 34, and the connection of the strips 22a and 22b at the rivets is thus made sufficiently flexible to avoid over-strain of any part of either spring. The drawings illustrate how the springs stand apart throughout substantially the entire portions thereof that flex when the armature 26 is attracted into position to close the contacts 17 and 18.

This particular control device lends itself to adaptation in a large variety of uses. In particular it is however, of advantage as a starter switch for split phase motors. In these devices the starter winding should be energized in starting the motor until the speed of the motor reaches a certain point. The real nature of a starter winding is such that above the predetermined speed where the starter switch should open the starter winding does not help any, and in fact, it may reduce the power of the motor if it remains in circuit at higher speeds. This is due to the fact that the position of the starter winding in the stator of the motor would cause its effect to be out of phase with the effect of the main winding. This control device has the advantage of keeping the starter winding in circuit up to the desired speed and avoiding cutting in the starter winding when the speed of the motor is dropping until the speed actually reaches a level where the starter winding can help. In other words, if the speed of the motor is being retarded due to increased load, this device will allow the speed to fall below the normal speed at which the switch would cut out before it will close the starter circuit. This is readily explained by reference to the action of the armatures 23 and 26, and the control exerted upon them by the springs. The energy of the springs 22 and 27 holding the armature 26 in the position shown in Figure 1 of the drawings must be substantially less than the magnetic attraction on the armature 26 at the instant when the armature 23 breaks loose from the attraction of the core 10. The armature can easily close the contacts against the pressure of the springs 22 and 27.

It is apparent that there must be more flux in the core 10 to cause the armature 26 to start to move and to release the armature 23 than would be necessary to swing the armature 26 toward circuit closing position if the armature 23 were not present. Further, in order to close the starter circuit contacts 17 and 18 the current in the main winding must be somewhat greater than that necessary to keep the contacts closed. The cooperation between the armatures 23 and 26 results in storing up potential energy in the magnetic flux from the core 10 for closing the contacts 17 and 18 with a snap action. Once the contacts are closed light variations in flux or high speed variations in flux will not cause the contacts 17 and 18 to open and close because the pin 30 is moving along an arc that is almost parallel to the spring 22 for a substantial distance as the armature 26 recedes from the position shown in Figure 2 of the drawings. When the current has finally dropped to a point where it no longer can hold the armature 26 in position to keep the contacts together, the separation of the contacts is quite rapid due to the overbalancing of the magnetic pull by the springs 22 and 27. In case of the contacts 17 and 18 sticking or "freezing" to each other because of some freak current condition the added weight of the slug 23 is of considerable advantage in causing the contacts to break apart by vibration of the motor.

This device has the advantage also that it can be used in one size over a relatively large range of motor size. I find that I can group the motors of fractional horsepower into about four groups; one group being from $\frac{1}{20}$ to $\frac{1}{8}$ horsepower, another group being from $\frac{1}{8}$ to $\frac{1}{4}$ horsepower, a third group being from $\frac{1}{3}$ to $\frac{3}{4}$ horsepower, and the large group being from 1 to 2 horsepower. One size switch will handle the motor size in a group. I can then change the springs and use that same size switch with the changed springs for the next group. In other words, one size of switch casing, core and armature construction would take care of groups 1 and 2, while another size would take care of groups 3 and 4.

Figure 5:
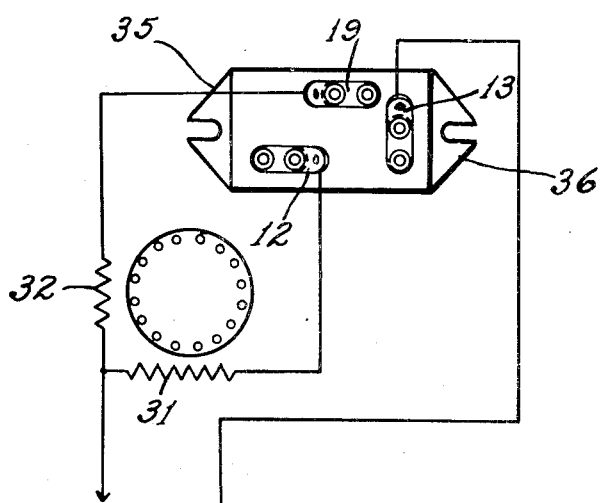
Figure 5 is a bottom plan view of the device showing the wiring terminals with a diagrammatic showing of a suitable circuit.

The switch housing 14 preferably is closed by front and back covers 37 and 38 so as to seal the switch mechanism. The covers can be secured by any suitable means to make the enclosure dust, liquid and gas tight. Mounting of the switch is accomplished by two ears 35 and 36 at the opposite ends of the switch housing. These ears are slotted as shown in Figure 5 of the drawings so that the housing can be readily mounted.

It is believed that the nature and advantages of my invention will be apparent from the foregoing description.

Having thus described my invention, I claim:

1. A control switch adapted to control such circuits as those energizing starting windings in split phase motors, comprising in combination an electromagnet core, a coil thereon having terminal connections whereby control current may be passed through it, an armature attracted by said core in response to the flow of current in the coil, a pair of contacts adapted to be connected in the controlled circuit, spring means carrying one of said contacts, a second armature connected to the spring mounted contact and positioned adjacent to a portion of said core in the open position of the contacts whereby the attraction of the core when energized tends to hold the contacts open, and means operable to compress said spring means and actuated by the first named armature when the first named armature is attracted by the core with sufficient force to force the spring mounted contact to closed position thereby moving the second armature away from the core.

2. A current operated control device comprising in combination a coil in which the control current may flow, a core of ferro-magnetic material having spaced pole faces, an armature having end portions positioned to be attracted by said pole faces, a spring arm adjacent to said armature and having a control element thereon adjacent to a pole face of said core, said armature having means thereon for pressing said arm in a direction to move said element away from said pole face as the armature is attracted, and an auxiliary armature secured to the arm in proximity to a pole face of the core, whereby to be attracted thereby and to oppose movement of the arm by the first armature.

3. A current operated control device comprising in combination a coil in which the control current may flow, a core of ferro-magnetic material having spaced pole faces, an armature having end portions positioned to be attracted by said pole faces, an arm adjacent to said armature and having a control element thereon positioned by said arm, when said armature is not attracted by the core adjacent to a pole face of said core, said armature having means thereon for pressing said arm in a direction to move said element away from said pole face as the armature is attracted, means yieldingly opposing the action of said armature, and an auxiliary armature secured to the arm in proximity to a pole face of the core to be attracted thereby and to oppose movement of the arm by the first armature.

4. A current operated control device comprising in combination a coil in which the control current may flow, a core of ferro-magnetic material having spaced pole faces, an armature movably mounted in position to be attracted by said core, a movable control element having a second armature attached thereto and positioned adjacent to a portion of said core to be attracted thereby, means operable by the first armature when it is attracted by the core to force the second armature away from the core, and means operable upon deenergization of said core to return the second armature to its attracted position.

5. A current operated control device comprising in combination a coil in which the control current may flow, a core of ferro-magnetic material having spaced pole faces, an armature movably mounted in position to be attracted by said core, a movable control element having a second armature attached thereto and positioned adjacent to a portion of said core to be attracted thereby, means operable by the first armature when it is attracted by the core to force the second armature away from the core, and means operable upon deenergization of said core to return the second armature to its attracted position, said last named means comprising a leaf spring carrying the control element and the second armature.

6. A current operated control device comprising in combination a coil in which the control current may flow, a core of ferro-magnetic material having spaced pole faces, an armature comprising an elongated bar pivotally mounted between said pole faces in position to be attracted by said core, a movable control element having a second armature attached thereto and positioned adjacent to a portion of said core to be attracted thereby, means operable by the first armature when it is attracted by the core to force the second armature away from the core, and means operable upon deenergization of said core to return the second armature to its attracted position, said last named means comprising a leaf spring carrying the control element and the second armature, and said first named means comprising a pin on the first armature engaging said spring.

7. A current operated control device comprising in combination a coil in which the control current may flow, a core of ferro-magnetic material having spaced pole faces, an armature comprising an elongated bar pivotally mounted between said pole faces in position to be attracted by said core, a movable control element having a second armature attached thereto and positioned adjacent to a portion of said core to be attracted thereby, means operable by the first armature when it is attracted by the core to force the second armature away from the core, and means operable upon deenergization of said core to return the second armature to its attracted position, said last named means comprising a leaf spring carrying the control element and the second armature, and said first named means comprising a pin on the first armature engaging said spring, said pin being movable lengthwise of the spring as it engages the spring whereby to dampen any vibrations of the spring.

8. A control switch adapted to control such circuits as those energizing starting windings in split phase motors, comprising in combination an electromagnet core, a coil thereon having terminal connections whereby control current may be passed through it, an armature attracted by said core in response to the flow of current in the coil, a pair of contacts adapted to be connected in the controlled circuit, spring means carrying one of said contacts, a second armature fixed to the spring mounted contact and movable by the spring means into close proximity to the core where it is normally attracted and held in fixed position by the magnetism of the core, and means on the first named armature operable by movement of the armature in response to increase of current in said coil to force the second armature from the core and effect closing of the contacts.

JAMES G. JUHASZ.

REFERENCES CITED

The following references are of record in the file of this patent:

UNITED STATES PATENTS

| Number | Name | Date |
|---|---|---|
| 593,481 | Lowrie | Nov. 9, 1897 |
| 1,104,077 | Smith | July 21, 1914 |
| 1,342,256 | Erickson | June 1, 1920 |
| 1,767,104 | Volkman et al. | June 24, 1930 |
| 2,245,596 | Lindberg | June 17, 1941 |
| 2,261,016 | Carlson | Oct. 28, 1941 |
| 2,262,495 | Hausler | Nov. 11, 1941 |